(12) United States Patent
Bonic et al.

(10) Patent No.: US 12,293,199 B2
(45) Date of Patent: May 6, 2025

(54) AUTOMATED USER INTERFACE GENERATION FOR AN APPLICATION PROGRAMMING INTERFACE (API)

(71) Applicant: Red Hat, Inc., Raleigh, NC (US)

(72) Inventors: Janos Bonic, Vienna (AT); Sanja Bonic, Vienna (AT); Sandro Bonazzola, Milan (IT); Dustin Louis Black, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/080,619

(22) Filed: Dec. 13, 2022

(65) Prior Publication Data

US 2024/0192970 A1    Jun. 13, 2024

(51) Int. Cl.
*G06F 3/048*     (2013.01)
*G06F 3/04842*   (2022.01)
*G06F 9/451*     (2018.01)

(52) U.S. Cl.
CPC .......... *G06F 9/451* (2018.02); *G06F 3/04842* (2013.01)

(58) Field of Classification Search
CPC ............................... G06F 9/451; G06F 3/0482
See application file for complete search history.

(56) References Cited

U.S. PATENT DOCUMENTS

| 7,318,066 B2 | 1/2008 | Kaufman et al. | |
| 7,779,369 B1* | 8/2010 | Dassow | G06F 9/451 |
| | | | 715/781 |
| 10,152,308 B2 | 12/2018 | Prodan et al. | |
| 10,885,021 B1 | 1/2021 | Llorca et al. | |
| 10,928,982 B2* | 2/2021 | Hou | G06F 3/04817 |
| 2009/0157630 A1* | 6/2009 | Yuan | G06F 16/951 |
| | | | 715/810 |
| 2016/0105328 A1* | 4/2016 | Cooper | G06F 3/0484 |
| | | | 715/736 |
| 2017/0364369 A1* | 12/2017 | Wells | G06F 16/2423 |
| 2023/0063160 A1* | 3/2023 | Spector | G06F 9/543 |
| 2023/0231762 A1* | 7/2023 | Wang | H04L 41/064 |
| | | | 709/224 |

FOREIGN PATENT DOCUMENTS

EP    3764592 B1    3/2022

OTHER PUBLICATIONS

Bonic et al., "Arcalog: Enhancing Continuous Integration Systems with Assisted Root Cause Analysis", TechRxiv, Aug. 30, 2022.
Chen et al., "Automated root cause analysis with Watchdog RCA", Apr. 13, 2022, Datadog.
Worthington, "APM, Analytics and Root-Cause Analysis", Dec. 7, 2017, eG Innovations.
Wang et al., GRANO: Interactive Graph-based Root Cause Analysis for Cloud-Native Distributed Data Platform, eBay Inc.

* cited by examiner

*Primary Examiner* — Mahelet Shiberou
(74) *Attorney, Agent, or Firm* — Womble Bond Dickinson (US) LLP (57) ABSTRACT

Techniques for generating a user interface are disclosed. An example method includes receiving, from an application programming interface (API), a file containing API data. The method also includes applying, by a processing device, a set of pattern matching rules to a segment of the API data to identify a graphical user interface component to be used to display the segment. The method also includes populating the graphical user interface component with data from the segment. The method also includes generating a user interface comprising the graphical user interface component.

14 Claims, 6 Drawing Sheets

Receiving, from an application programming interface (API), a file containing API data 402

Applying, by a processing device, a set of pattern matching rules to a segment of the API data to identify a graphical user interface component to be used to display the segment 404

Populating the graphical user interface component with data from the segment 406

Generating a user interface comprising the graphical user interface component 408

AUTOMATED USER INTERFACE GENERATION FOR AN APPLICATION PROGRAMMING INTERFACE (API)

TECHNICAL FIELD

Aspects of the present disclosure relate to techniques for automatically generating a user interface for viewing data received from an API.

BACKGROUND

An application programming interface (API) can be used as a standardized interface between two computer programs or between two distinct parts of the same program, such as when using a library provided by a third party to accomplish a specific task within a program. APIs enable developers the share an application's data and functionality without requiring other users to have knowledge about how the application operates or how it is implemented. Some APIs, such as server-side Web APIs, deal with the interaction between remote computer systems. Other APIs may interface locally within a computing system.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Aspects of the present disclosure relates to techniques for automatically generating a user interface to be used for data received from an API. APIs are used with many different types of applications, including Web applications, workflow applications, continuous integration (CI) applications, and many others. To make the best use of data received from an API, it's helpful to have a good understanding of what the received data represents.

Some API mechanisms require the author to create a schema that describes the data fields and data structure the caller is supposed to send in a strict and machine-readable format. However, many API mechanisms, such as Web APIs, do not require such schemas. Typically, the author will want to publish API documentation, but the quality and detail varies greatly. To address this problem, standards such as the OpenAPI specification have been developed to ensure that the data structure is accurately described even when the author is not forced to do so. Nevertheless, it may still be the case that a specific API may not have any associated documentation.

Some APIs may tend to create a large, complex data sets. For example, continuous integration systems can ingest a large body of software for integration into a shared source code repository. Failure to merge source code changes into a main codebase can produce various error messages related to errors of a compiler for example. This data may be difficult to analyze because these could be hundreds of megabytes of data per job run. Another example is a workflow engine with performance measurement tools. The performance measurement tools gather performance data related to system performance in response to a workload, such as CPU, disk storage, or network performance statistics, for example.

To facilitate the analysis of such large volumes of data, it may be helpful to have a visual display of the data. To display the data received from an API in the conventional way typically requires that a user interface be developed manually. In some cases, this may involve an added level of labor-intensive work that may be cumbersome for some developers. For example, performance engineers creating workflow performance applications may not have the time or expertise to develop visual user interfaces. Furthermore, this sort of development would detract from the main objective of the developer, which is the quick efficient generation of workflows.

Aspects of the disclosure address the above-noted and other deficiencies by providing a system for automatically generating a user interface for viewing data generated by an API. As used herein, the term "automatic" or "automatically" refers to performance by machines or devices without human involvement. The automatic generation of the user interface may be accomplished by performing a pattern matching process over the data received from the API. In some embodiment, the API schema may be used to provide further information about what the data represents. However, aspects of the present disclosure can also work without an API schema. In either case, various rules may be applied to the data to determine which type of display type is most appropriate for each segment of data. Some types of data may be automatically used to generate a graphical display object such as a plot, bar graph, timeline, pie chart, event log, and others. Additionally, some data may be displayed simultaneously in more that one display object to improve the user's ability to obtain useful information from the data.

In this way, aspects of the present disclosure automatically generate a complex view of the API data, which can include various graphical elements. This aids in root cause analysis of problems in CI systems, workflow engines, and other projects. Additionally, developers can make the best use of the data received from an API without having to spend the time to develop a custom user interface for the data.

Figure 1:
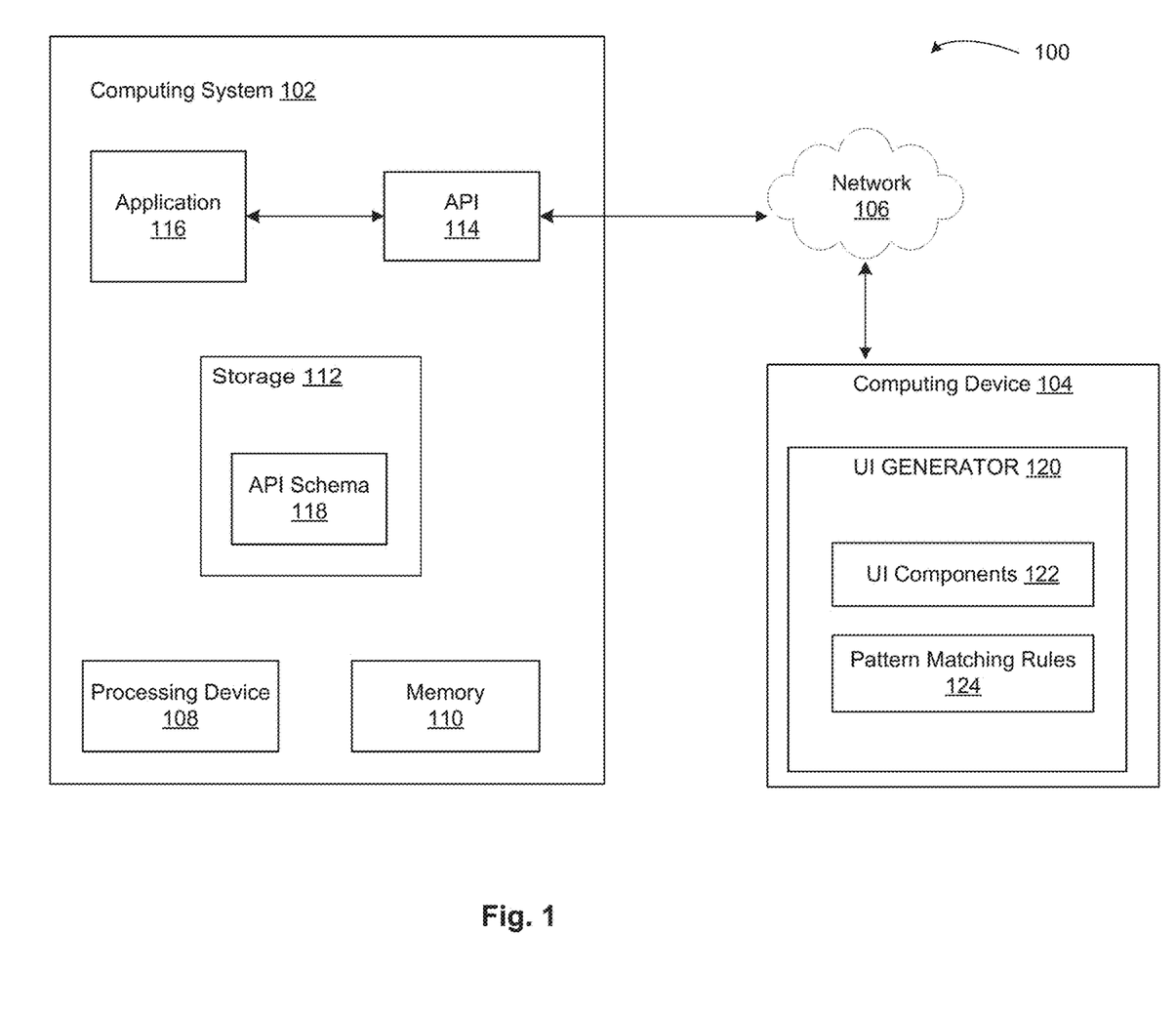
FIG. 1 is a block diagram of an example system in accordance with some embodiments of the present disclosure.

FIG. 1 is a block diagram of an example system 100 in accordance with some embodiments of the present disclosure. One skilled in the art will appreciate that other architectures are possible for system 100 and any components thereof, and that the implementation of a system utilizing examples of the disclosure are not necessarily limited to the specific architecture depicted by FIG. 1. The system 100 may include a computing system 102, which may be coupled to a computing device 104 through a network 106. The computing system 102 may be a cloud-based infrastructure configured, for example, as Service as a Service (SaaS) or Platform as a Service (PaaS). The computing system 102 may also be a non-cloud-based system such as a personal computer, one or more servers communicatively coupled through a network, and other configurations.

The computing device 104 may be any suitable type of computing device or machine that has a programmable processor including, for example, server computers, desktop computers, laptop computers, tablet computers, smartphones, set-top boxes, etc. In some examples, each of the computing device 104 may be a single machine or may include multiple interconnected machines (e.g., multiple servers configured in a cluster). The computing system 102 and computing device 104 may be implemented by a common entity/organization or may be implemented by different entities/organizations.

The network 106 may be a public network (e.g., the internet), a private network (e.g., a local area network (LAN) or wide area network (WAN)), or a combination thereof. In one embodiment, the network 106 may include a wired or a wireless infrastructure, which may be provided by one or more wireless communications systems, such as a WiFi hotspot connected with the network 106 and/or a wireless carrier system that can be implemented using various data processing equipment, communication towers (e.g. cell towers), etc. In some embodiments, the network 106 may be an L3 network. The network 106 may carry communications (e.g., data, message, packets, frames, etc.) between the computing system 102 and the computing devices 104.

Additionally, although the computing device 104 and computing system 102 are shown as being connected by a network 106, the present disclosure is applicable to any mode of communication through an API, such as between local computer programs executing within the same computing system 102 or the same computing device 104.

The computing system 102 can include one or more processing devices 108 (e.g., central processing units (CPUs), graphical processing units (GPUs), etc.), main memory 110, which may include volatile memory devices (e.g., random access memory (RAM)), non-volatile memory devices (e.g., flash memory) and/or other types of memory devices, and a storage device 112 (e.g., one or more magnetic hard disk drives, a Peripheral Component Interconnect [PCI] solid state drive, a Redundant Array of Independent Disks [RAID] system, a network attached storage [NAS] array, etc.). In certain implementations, main memory 110 may be non-uniform access (NUMA), such that memory access time depends on the memory location relative to processing device 108. The storage device 112 may be a persistent storage and may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The storage device 112 may be configured for long-term storage of data. It should be noted that although, for simplicity, a single processing device 108, main memory 110, storage device 112, are shown, other embodiments may include a plurality of processing devices, memories, and storage devices. Additionally, the computing system 102 may have additional components not shown in FIG. 1. The computing device 104 may include similar architectures.

The computing device 104 may be configured to communicate with an application 116 through an Application Programming Interface (API) 114. The application 116 may be substantially any type of application, including a Web application, workflow application, continuous integration (CI) application, and others. The API 114 may be substantially any type of API, including publicly accessible APIs, private internal APIs. The API 114 may be a Web API that conforms to the OpenAPI specification. In some cases, the API 114 may be associated with an API schema 118, which may be stored in storage device 112.

The computing device 104 may request data from the application 116 running on computing system 102 by sending an API call to the API 114. The API call may include an address of the API 114 (e.g., the API's Uniform Resource Identifier (URI)), and other information such as a request verb that indicates what data is being requested. If the API call is valid, the API 114 can make calls to the application 116 and return the requested data to the computing device 104. The computing device can also request the API schema 118 from the API 114. In some cases, the API schema 118 may not be available. If the API schema 118 is available, it can be retrieved by the API 114 and sent to the requesting computing device 104. The API schema 118 may be a JSON schema document, an OpenAPI description, or other schema type.

The computing device also included a user interface (UI) generator 120, which processes and analyzes the data received from the API 114 to determine a suitable display type for displaying the API data. The API data may be automatically divided into segments, such that each segment can be displayed using a different display type. The display types may include plain text elements (e.g., the raw data) and graphical elements such as line graphs, bar graphs, pie charts, timelines, log viewers, and others. The graphical elements may be referred to herein as UI components 122. The UI components 122 to be used for a particular segment of API data may be determined based on patterns in the data as defined by a set of pattern matching rules 124. Various patterns may be associated with one or more specific data types. The pattern matching rules 124 are used associate specific data types identified in the API data with one or more UI components 122. In some examples, the API schema may be used to help determine the meaning of some of the API data, which may be used to determine the data type and/or to augment the display of data with information that may be useful to the user. Examples of such augmentation include adding labels to the data, determining what type of graphical UI component to use to display the data, etc.

Upon receiving a set of API data, the UI generator 120 traverses the data set to identify patterns indicative of specific data types. The identification of data types may be assisted by the API schema 118, if available. When a specific data type is identified in the API data, the UI generator 120 can identify one or more suitable UI components 122 for displaying the data based on the pattern matching rules 124, which associate specific data types with specific UI components 122.

The data types may include objects, maps, lists, strings, integers, floats, enums, timestamps, durations, IDs, and others. Maps and objects are both key-value pairs. Objects are key-value pairs that are defined in the API schema 118 and can contain only a set of keys described in the schema. Maps are key-value pairs with freeform keys that are not defined in the API schema 118. Lists are an ordered collection of elements. Strings are human-readable texts. Integers are whole numbers. Floats are decimal numbers (may be used to describe integers). Enums are string or integer types defined in the API schema 118 and can contain only a discrete set of values as described in the schema. Timestamps describe a specific point in time. Timestamps may be encoded in either integers or strings in a specific format (e.g. YYYY-MM-DD HH:mm:ss). Durations describe a time interval (e.g. 5 hours), and IDs are unique identifiers inside a list or map.

The UI components 122 may include log viewers, graphs, pie charts, event logs, timespans, timelines, and others. A log viewer may be a vertically scrollable list that shows the timestamp of a log message and the log message next to it. A graph may be an X-Y chart that plots data on the Y-axis and timestamps on the X-axis. Some graphs may display more than one series of data. Additional data can be added to the graph such as labels, legends, events (e.g., shown as vertical red lines), and timespans (e.g., shown as background colors). A pie chart may be a round chart that shows proportions of items to one another. An event log may be a type of log viewer that includes a bar chart above, showing the number of log messages associated with a given time segment. Timespan may be a list of from-to timestamps shown on a timeline with a possibly associated message.

A list of example pattern matching rules 124 are described below. However, it will be appreciated that the following list is not exhaustive. Additionally, a user may be able to define additional rules to use for pattern matching.

According to the pattern matching rules 124, line or bar graphs may be generated from maps with keys that are timestamps and values that are integers or floats, as shown below:

```
{
  "2022-11-10 08:10:00": 1,
  "2022-11-10 08:11:00": 2,
  "2022-11-10 08:12:00": 4
}
```

Line or bar graphs may be also generated from maps with keys that are time stamps and objects that are integers or floats, or maps with keys that are strings and values that are integers or floats, as shown below.

```
{
  "2022-11-10 08:10:00": {
    "data1": 1,
    "data2": 2,
  },
  "2022-11-10 08:11:00": {
    "data1": 2,
    "data2": 3,
  }
}
```

In some embodiments, the key associated with the value may be used as a legend. In the case of objects (but not maps), additional information for visual representation, such as unit types, scale dimensions, and others may be extracted from the API schema 118, if available. For example, the API schema 118 could contain the information that a certain integer is meant to describe a percentage, which can influence the display.

Line or bar graphs may be also generated from lists containing numbers, as shown below.

```
[
  1,
  2,
  5,
  3
]
```

The pattern matching rules 124 may specify that an event component is to be generated for any object with timestamp keys that does not match the above rules for generating an line or bar graph. An example object that may be used to generate an event is shown below.

```
{
  "2022-11-10 08:10:00": {
    "type": "created",
    "id": "asdf"
  }
}
```

The pattern matching rules 124 may also specify that an event component is to be generated for a list containing an object or map with a single timestamp as shown below.

```
[
  {
    "timestamp": "2022-11-10 08:10:00",
    "type": "created",
    "id": "asdf"
  }
]
```

If more than one other field is present in the object (such as type and id above), the UI generator 120 may create a single event with multiple data values attached or transform the record into multiple events.

The pattern matching rules 124 may also specify that a pie chart is to be generated for a map or object with short strings as keys and integers or floats as values as shown below.

```
{
  "apple": 15,
  "banana": 5
}
```

A pie chart may be generated for a list of objects with a single number and a single string as shown below.

```
[
  {
    "fruit": "apple",
    "percentage": 15,
  },
  {
    "fruit": "banana",
    "percentage": 5,
  }
]
```

The pattern matching rules 124 may specify that a log viewer is to be generated for maps that have timestamp keys and string values, as shown below.

```
{
    "2022-11-10 00:00:00": "Some log message"
}
```

Similarly, a log viewer may be generated for a list of objects that have timestamp keys and string values as shown below.

```
[
    {
        "timestamp": "2022-11-10 00:00:00",
        "message": "Some log message"
    }
]
```

Figure 2:
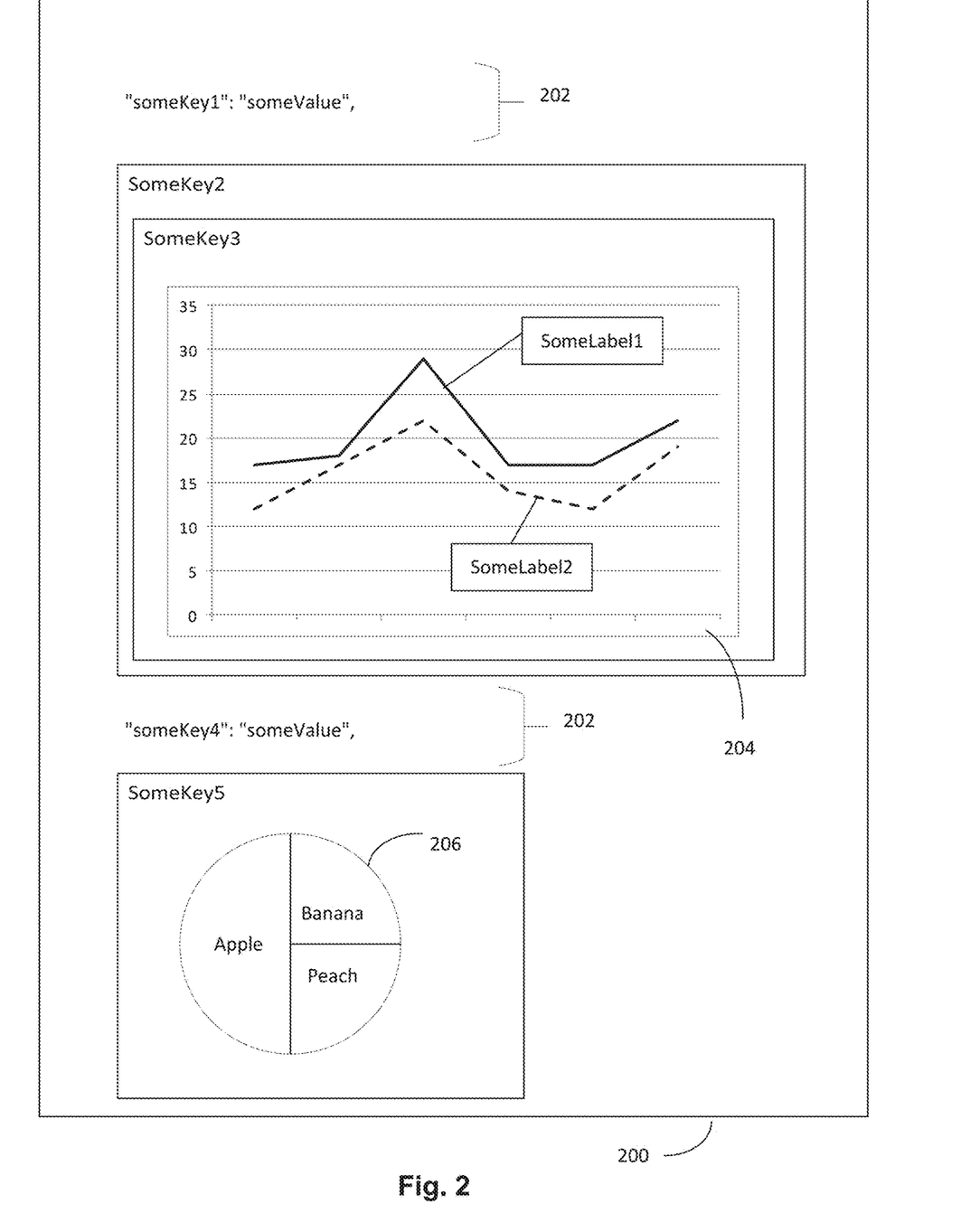
FIG. 2 is an example of a user interface that may be generated by the UI generator 120 in accordance with some embodiments of the present disclosure.

If API data segments are discovered to match any of the rules above, the corresponding UI components 122 may be generated and rendered in labeled boxes or foldable sections. If strings labeled "title" or "name" are encountered, they may be used as headers for a box or foldable section containing a UI component. Any data segments that do not match any of the pattern matching rules may be rendered as strings of plain text representing the raw API data. The structural features of the API data may also effect the placement of user interface elements. For example, as shown in FIG. 2, elements may be position within the user interface at positions that correlate with the relative locations of the corresponding segments of the API data. Additionally, if a particular segment of the API data is nested within a hierarchical data structure, the corresponding UI component 122 may be displayed within one or more graphical container of the user interface that reflect the same structure.

Figure 3:
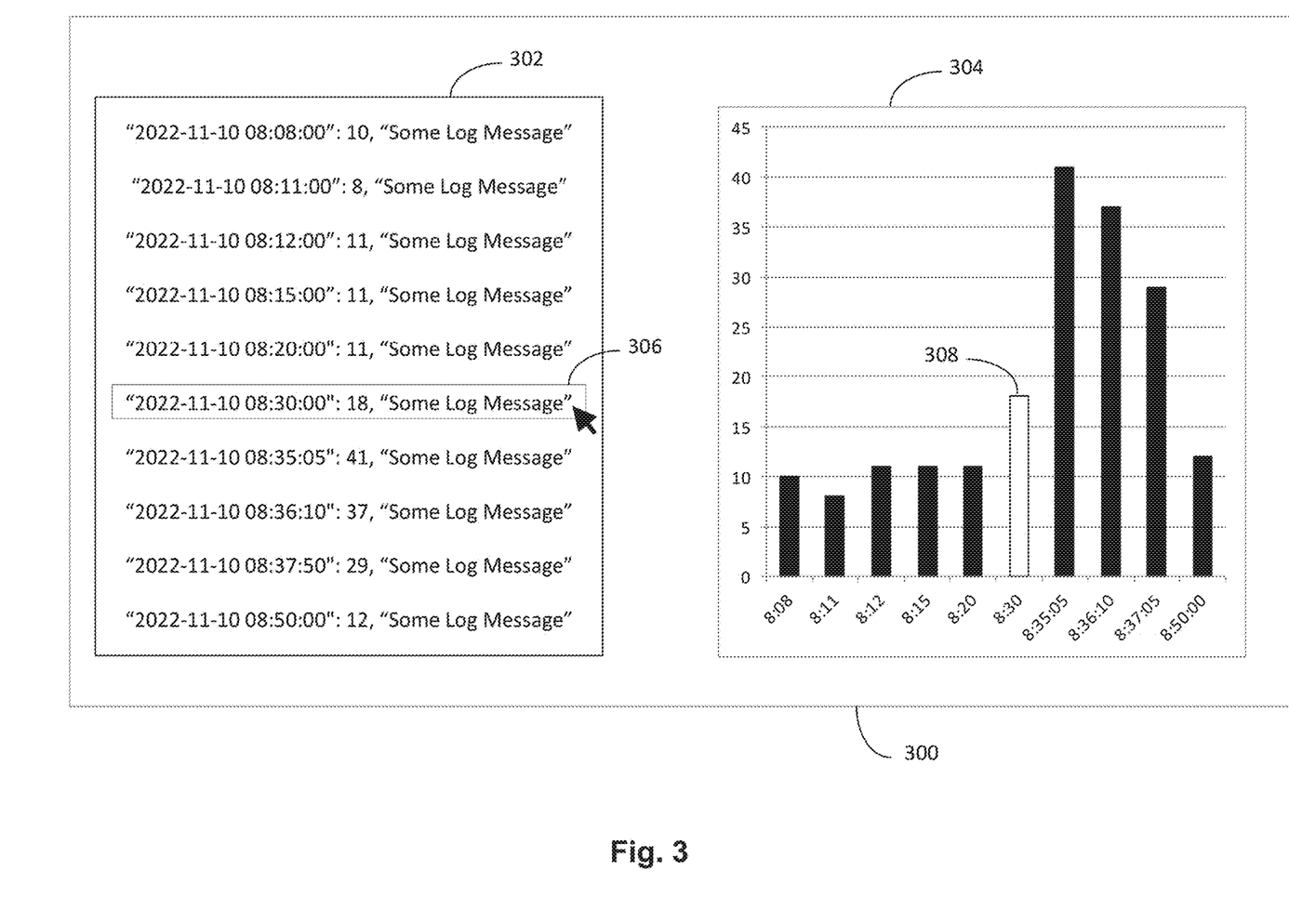
FIG. 3 is another example of a user interface 300 that may be generated by the UI generator in accordance with some embodiments of the present disclosure.

When the individual UI components are compiled from the API data set, some components may be rendered next to one another. For example, some data segments may be rendered as more than one type of component, for example, a line graph and a log viewer. As the user traverses elements with a time component, other components of the user interface may be synchronized, so that a user can visually identify correlating elements, such as events and graph anomalies. The user interface can be further enhanced by adding additional metadata from API schema 118. For example, the API schema may identify a particular data item as representing a number of bytes, which may be added to the user interface as a title, label, legend, or the like. Example user interfaces that may be generated by the UI generator 120 are shown in FIGS. 2 and 3.

FIG. 2 is an example of a user interface 200 that may be generated by the UI generator 120 in accordance with some embodiments of the present disclosure. The user interface 200 is generated using the API data shown below.

```
{
    "someKey1": "someValue",
    "someKey2": {
        "someKey3": {
            "2022-11-10 08:10:00": 12, 17
            "2022-11-10 08:11:00": 17, 18
            "2022-11-10 08:12:00": 22, 29
            "2022-11-10 08:13:00": 14, 17
            "2022-11-10 08:14:00": 12, 17
            "2022-11-10 08:15:00": 19, 22
        }
    },
    "someKey4": "someValue",
    "someKey5": {
```

-continued

```
        {
            "fruit": "apple",
            "percentage": 50,
        },
        {
            "fruit": "banana",
            "percentage": 25,
        },
        {
            "fruit": "peach",
            "percentage": 25,
        }
    }
}
```

As shown in FIG. 2, the user interface 200 includes elements of raw data 202, which is API data that does not adhere to any of the predefined rules and is shown as plain text. Such data may be shown as it is found in the API data and may be placed in the user interface 200 at the same relative location that it is found in the API data. In this example, the raw data 202 corresponds with the API data "someKey1" and "someKey4" shown above.

The user interface 200 also includes a line graph 204. The labels "SomeKey2" and "SomeKey3" are derived from the keys of the same name shown in the API data above. Since these keys are nested in the API data, there also shown as nested components of the user interface 200. Also, since the data for the line graph is nested within "SomeKey3" the line graph is shown as a nested component within the box labeled "SomeKey3". Any of these nested components may be collapsed or expanded based on input from the user.

Each line in the line graph 204 is generated based on the corresponding API data, which fits the pattern defined for a line graph. The lines are labeled SomeLabel1 and SomeLabel2. These labels do not appear in the API data, but may be obtained by reference to the API schema, which in this case provides additional information about what the data represents. Although not shown in FIG. 2, the time stamps associated with the data may also be displayed along the X-axis. Additionally, time stamp data may be hidden or revealed based on input from the user. For example, the user may hover over a data point to reveal the associated time stamp.

The user interface 200 also includes a pie graph 206 generated from the API data above that fits the pattern predefined for a pie graph. The label "SomeKey5" is derived from the key of the same name shown in the API data above. Since the data for the pie graph 206 is nested within "SomeKey5" the pie graph 204 is shown as a nested component within the box labeled "SomeKey5". The pie chart 204 may be collapsed or expanded based on input from the user.

It can be appreciated that the automatically generated user interface 200 provides a much more informative view of the API data compared to simply listing the API data in raw form. Additionally, it will be appreciated that the user interface 200 is only an example, and that there may be various additional ways of representing the same data.

FIG. 3 is another example of a user interface 300 that may be generated by the UI generator 120 in accordance with some embodiments of the present disclosure. In this example, the same segment of API data is displayed using two different user interface components. The API data fits the pattern associated with a log viewer and is therefore shown within a log viewer component 302 in the user interface 300. The data also fits the pattern associated with a bar chart and is therefore also shown as a bar chart component 304. The two user interface components are shown side-by-side horizontally to indicate to the user that both user interface components are derived from the same segment of API data.

In some embodiments, if the user selects a portion of one user interface component the corresponding data point in the other user interface component will also be highlighted and/or emphasized. In the example shown in FIG. 3, the user has selected log entry 306 and the corresponding bar 308 of the bar chart 304 is also highlighted. Similarly, if a bar of the bar chart 304 is selected, the log viewer 302 can automatically scroll to the relevant portion of the log viewer 302 and highlight the corresponding log.

It will be appreciated that the user interface 300 is only an example, and that there may be various additional ways of representing the same data. For example, a particular segment of data may be shown as any suitable number of user interface components including three or more.

Figure 4:
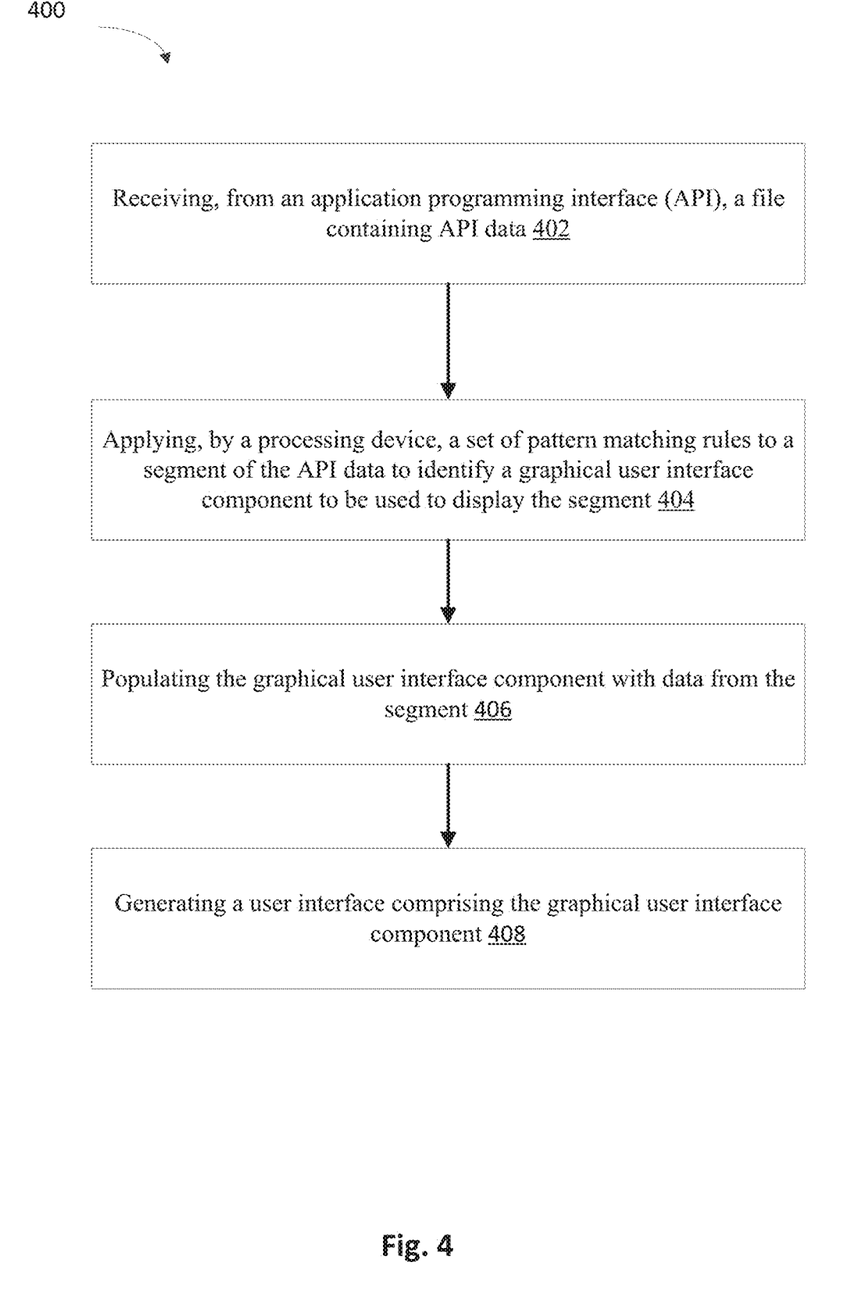
FIG. 4 is a process flow diagram summarizing a method of automatically generating a user interface, in accordance with some embodiments of the present disclosure.

FIG. 4 is a process flow diagram summarizing a method of automatically generating a user interface, in accordance with some embodiments of the present disclosure. Method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by the UI generator 120 of FIG. 1. The method may begin at block 402.

At block 402, a file containing API data is received from an application programming interface (API). The API data may be received over a network from a remote computing device such as a Web server. The API data may also be received from a local device running on the same computer or computing system.

At block 404, a set of pattern matching rules is applied to a segment of the API data to identify a graphical user interface component to be used to display the segment. The pattern matching rules may be any of the rules described above.

At block 406, the graphical user interface component is populated with data from the segment. Additionally, if an API schema is available, the user interface may be augmented with additional data obtained from the API schema.

At block 408, a user interface is generated that includes the graphical user interface component identified at block 404 and populated at block 406. The user interface may include several graphical user interface components of various types as well as raw API data. Each element of the user interface (raw data and graphical user interface components) are shown at the same position within the user interface that correlates with the locations that the segments of API data are found in the file of API data.

It will be appreciated that embodiments of the method 400 may include additional blocks not shown in FIG. 4 and that some of the blocks shown in FIG. 4 may be omitted. Additionally, the processes associated with blocks 402 through 408 may be performed in a different order than what is shown in FIG. 4.

Figure 5:
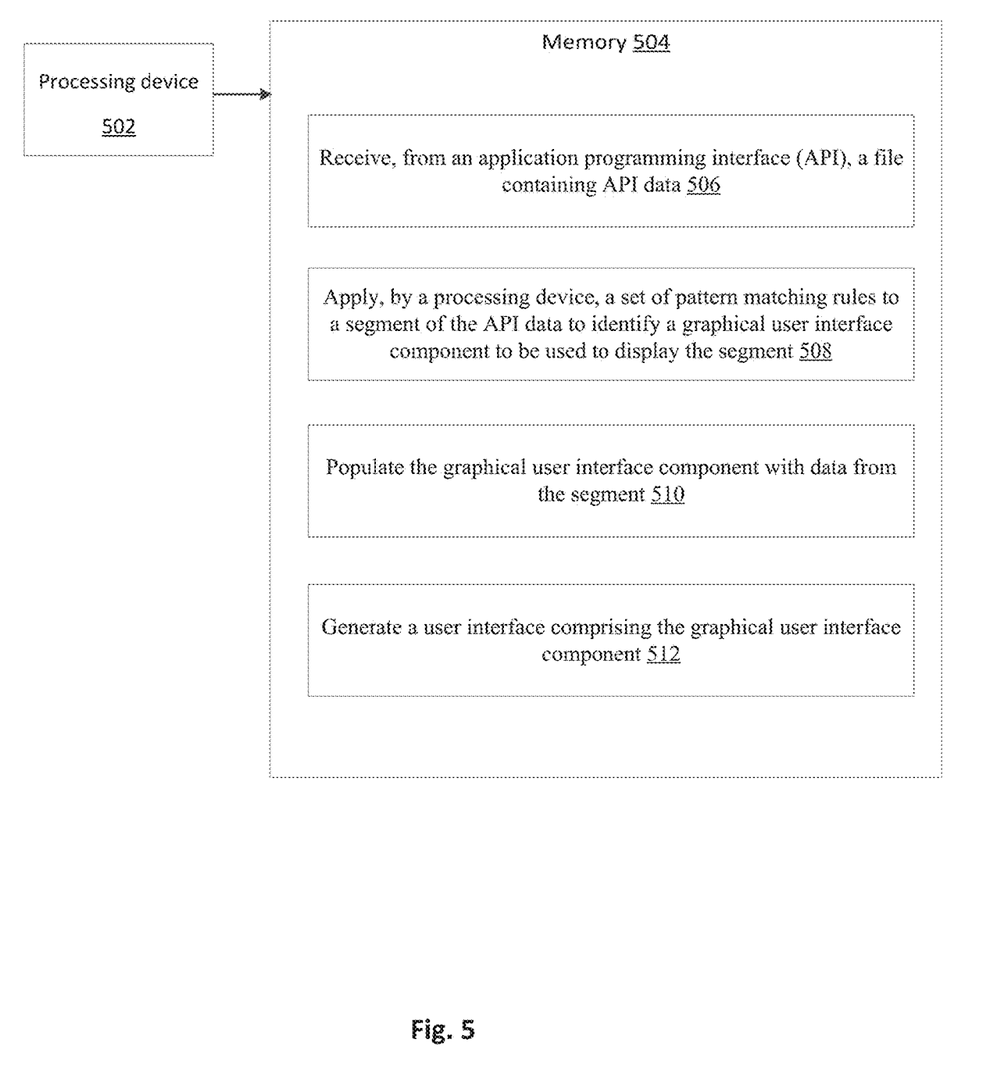
FIG. 5 is a simplified block diagram of a system for automatically generating a user interface, in accordance with some embodiments of the present disclosure.

FIG. 5 is a simplified block diagram of a system for automatically generating a user interface, in accordance with some embodiments of the present disclosure. The system 500 includes a processing device 502 operatively coupled to a memory 504. The memory 504 can include instructions that are executable by the processing device 502 to cause the processing device 502 to generate a user interface.

The memory 504 includes instructions 506 to receive, from an application programming interface (API), a file containing API data. The memory 504 also includes instructions 508 to apply, by a processing device, a set of pattern matching rules to a segment of the API data to identify a graphical user interface component to be used to display the segment. The memory 504 also includes instructions 510 to populate the graphical user interface component with data from the segment. The memory 504 also includes instructions 512 to generate a user interface comprising the graphical user interface component.

It will be appreciated that embodiments of the system 500 may include additional blocks not shown in FIG. 5 and that some of the blocks shown in FIG. 5 may be omitted.

Figure 6:
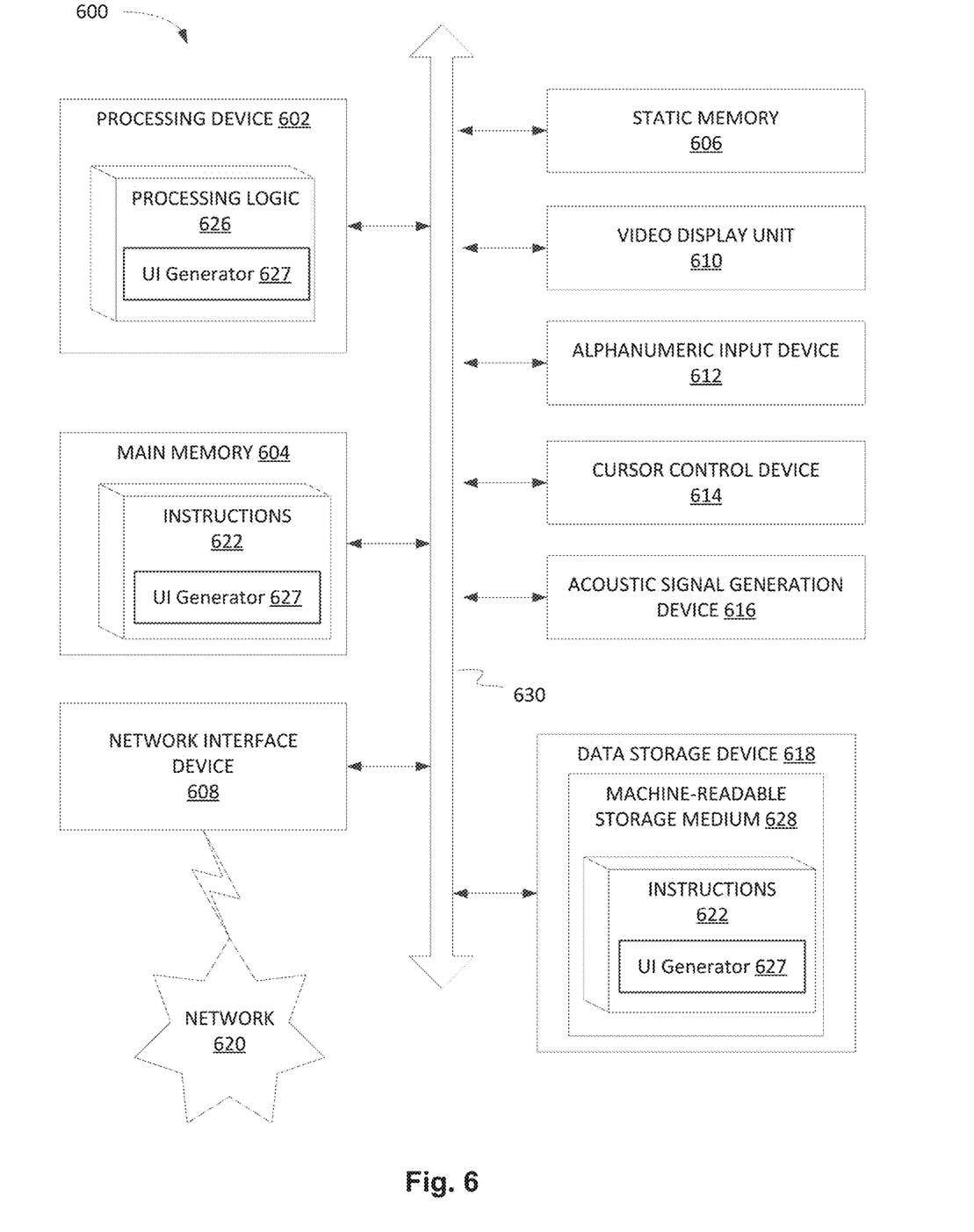
FIG. 6 illustrates a diagrammatic representation of a machine in the example form of a computer system within which a set of instructions, for causing the machine to perform any one or more of the methodologies discussed herein, may be executed.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a web appliance, a server, and other machines capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as a cloud server, configured as a developer platform for building, storing, testing, and distributing software packages.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein. For example, the processing logic 626 may include logic for performing the functions of a user interface generator 627.

The data storage device 618 may include a machine-readable storage medium 628, on which is stored one or more set of instructions 622 (e.g., software) embodying any one or more of the methodologies of functions described herein, including instructions to cause the processing device 602 to perform the functions of the user interface generator 627. The instructions 622 may also reside, completely or at least partially, within the main memory 604 or within the processing device 602 during execution thereof by the computer system 600; the main memory 604 and the processing device 602 also constituting machine-readable storage media. The instructions 622 may further be transmitted or received over a network 620 via the network interface device 608.

While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "applying," "populating," "identifying," "transmitting," "sending," "storing," "determining," "processing," "generating," "augmenting," "highlighting," "nesting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving, from an application programming interface (API), a file containing API data;
applying, by a processing device, a set of pattern matching rules to the API data to identify graphical user interface components to be used to display the API data;
responsive to determining that a same segment of the API data fits a pattern associated with two different types of graphical user interface component, generating a user interface comprising first and second graphical user interface components that display the same segment of the API data using different visual formats;
responsive to determining that a second segment of the API data does not match with any of the pattern matching rules, displaying the second segment of the API data within the user interface as plain text that represents the API data in raw form; and
responsive to determining that a third segment of the API data is nested within a hierarchical data structure of the file, nesting a third graphical user interface component within a graphical container of the user interface that visually reflects the hierarchical data structure of the file, wherein the graphical container comprises a visual label comprising text extracted from the API data at a higher level of the hierarchical data structure of the file compared to the third segment of the API data used to generate the third graphical user interface component.

2. The method of claim 1, wherein generating the user interface comprises adding the third graphical user interface component at a position within the user interface that correlates with a location of the third segment in the API data.

3. The method of claim 1, comprising receiving an API schema and augmenting the first, second, or third graphical user interface component with information from the API schema.

4. The method of claim 1, wherein the API data is processed to generate the user interface without using information from an API schema.

5. The method of claim 1, comprising, responsive to receiving a user selection of a data element in the first graphical user interface component, highlighting a corresponding data element in the second graphical user interface component.

6. A system comprising:
a memory; and
a processing device, operatively coupled to the memory, the processing device to:
receive, from an application programming interface (API), a file containing API data;
apply, by a processing device, a set of pattern matching rules to the API data to identify graphical user interface components to be used to display the API data;
responsive to a determination that a same segment of the API data fits a pattern associated with two different types of graphical user interface component, generate a user interface comprising first and second graphical user interface components that display the same segment of the API data using different visual formats;
responsive to a determination that a second segment of the API data does not match with any of the pattern matching rules, display the second segment of the API data within the user interface as plain text that represents the API data in raw form; and
responsive to a determination that a third segment of the API data is nested within a hierarchical data structure of the file, nest a third graphical user interface component within a graphical container of the user interface that visually reflects the hierarchical data structure of the file, wherein the graphical container comprises a visual label comprising text extracted from the API data at a higher level of the hierarchical data structure of the file compared to the third segment of the API data used to generate the third graphical user interface component.

7. The system of claim 6, wherein to generate the user interface, the processing device is further to add the third graphical user interface component at a position within the user interface that correlates with a location of the third segment in the API data.

8. The system of claim 6, wherein the processing device is further to receive an API schema and augment the first, second, or third graphical user interface component with information from the API schema.

9. The system of claim 6, wherein the processing device is to generate the user interface without using information from an API schema.

10. The system of claim 6, wherein the processing device is further to:
receive a user selection of a data element in the first graphical user interface component; and
responsive to the user selection, highlight a corresponding data element in the second graphical user interface component.

11. A non-transitory computer-readable storage medium including instructions that, when executed by a processing device, cause the processing device to:
receive, from an application programming interface (API), a file containing API data;
apply, by a processing device, a set of pattern matching rules to the API data to identify graphical user interface components to be used to display the API data;
responsive to a determination that a same segment of the API data fits a pattern associated with two different types of graphical user interface component, generate a user interface comprising first and second graphical user interface components that display the same segment of the API data side-by-side using different visual formats;
responsive to a determination that a second segment of the API data does not match with any of the pattern matching rules, display the second segment of the API data within the user interface as plain text that represents the API data in raw form; and
responsive to a determination that a third segment of the API data is nested within a hierarchical data structure of the file, nest a third graphical user interface component within a graphical container of the user interface that visually reflects the hierarchical data structure of the file, wherein the graphical container comprises a visual label comprising text extracted from the API data at a higher level of the hierarchical data structure of the file compared to the third segment of the API data used to generate the third graphical user interface component.

12. The non-transitory computer-readable storage medium of claim 11, wherein to generate the user interface, the instructions cause the processing device to add the third graphical user interface component at a position within the user interface that correlates with a location of the third segment in the API data.

13. The non-transitory computer-readable storage medium of claim 11, wherein the instructions further cause the processing device to receive an API schema and augment the first, second, or third graphical user interface component with information from the API schema.

14. The non-transitory computer-readable storage medium of claim 11, wherein the instructions further cause the processing device to generate the user interface without using information from an API schema.

\* \* \* \* \*